United States Patent [19]

Pfeiffer

[11] Patent Number: 5,754,544
[45] Date of Patent: May 19, 1998

[54] SWITCHING NETWORK FOR THE PICK-UP AND FORWARDING OF DATA STREAMS

[75] Inventor: Mathias Pfeiffer, Munich, Germany

[73] Assignee: Siemens Aktiengesellschaft, Munich, Germany

[21] Appl. No.: 600,492

[22] Filed: Feb. 13, 1996

[30] Foreign Application Priority Data

Feb. 13, 1995 [DE] Germany .................. 195 04 683.8

[51] Int. Cl.$^6$ ......................................... H04Q 11/06
[52] U.S. Cl. ..................... 370/359; 370/363; 370/368; 370/382
[58] Field of Search ......................... 370/359, 362, 370/363, 364, 368, 369, 374, 375, 378, 379, 381–383

[56] References Cited

U.S. PATENT DOCUMENTS 4,811,332   3/1989   Carse ............................. 370/364

FOREIGN PATENT DOCUMENTS 726692   8/1996   European Pat. Off. .

OTHER PUBLICATIONS

Publication Koppelnetze fur Zeitmultiplex–Vermittlungsstellen NTZ 1970 Heft 9, pp. 465–471.

Primary Examiner—Melvin Marcelo
Attorney, Agent, or Firm—Hill & Simpson

[57] ABSTRACT

A switching network for the pick-up and forwarding of data streams has a plurality of input line units and output line units which respectively accept or output data streams in fixed multiplex frames, and which are connected in common to an exchange bus. A respective data memory whose memory cells are individually allocated to the bit places of a multiplex frame for the individual output line units is provided in the input line units. The data bits of a multiplex frame are entered bit-by-bit into the corresponding memory cells in the data memories based on the criterion of allocation information. The memory cells of the individual data memories are synchronously driven by a central control unit in a fixed sequence for the output of stored data bits onto the exchange bus. Only one of the data bits corresponding to one another in the individual data memories is thereby enabled based on the criterion of enable information, whereas the others are masked. The output line units are driven in a corresponding sequence for the acceptance of valid data bits.

6 Claims, 3 Drawing Sheets

5,754,544

SWITCHING NETWORK FOR THE PICK-UP AND FORWARDING OF DATA STREAMS

BACKGROUND OF THE INVENTION

The invention is directed to a switching network for the pick-up of data streams supplied via a plurality of input trunks in time channels of input multiplex frames that occur in periodic repetition, and for the forwarding thereof via a plurality of output terminal equipment units in time channels of output multiplex frames occurring in periodic repetition.

Such switching networks can be generally used in order to distribute data streams supplied via multiplex links in time channels of pulse frames occurring in periodic repetition onto a plurality of outgoing multiplex links, i.e. to insert the data streams appearing in the individual incoming time channels into time channels of outgoing multiplex links. What are thereby also to be understood as data streams are, for example, streams of digital voice information that are to be received and forwarded via PCM links.

In conjunction with switching networks for time-division multiplex exchanges, "Nachrichtentechnische Zeitschrift (ntz)", 1970, No.9, pages 465 through 471 already disclose that central time switching stages are employed for a temporal allocation between time channels of incoming multiplex lines and time channels of outgoing multiplex lines. Such time switching stages thereby comprise a memory in order to intermediately store the signal streams occurring in incoming time channels for a time-suited forwarding in outgoing time channels. Such a memory can be designed such that the write-in thereto occurs optionally or randomly but the readout occurs cyclically.

SUMMARY OF THE INVENTION

It is an object of the present invention to disclose a way of how a switching network of the type initially cited can be designed in order to insert data streams supplied to this switching network in time channels into outgoing time channels with little circuit-oriented expense and control expense.

According to the switching network of the invention, data streams are supplied to a plurality of input line units. The data streams are transmitted in time channels of input multiplex frames appearing in periodic repetition. The switching network forwards the data streams via a plurality of output line units in time channels of output multiplex frames in periodic repetition. The input line units and the output line units are connected in common to an exchange bus. A data memory is provided for each of the input line units. Each of the respective data memories has a plurality of memory areas each having a respective plurality of memory cells available to it, these memory cells being individually allocated to the data bit places of an output multiplex frame for the individual output line units. For the acceptance of data bits supplied to the respective input line units in an input multiplex frame, the memory cells of the individual memory areas of the corresponding data memory are driven individually and randomly bit-by-bit according to the criterion of the allocation information respectively available to the input line unit. Under the control of a central control unit, the memory cells allocated to one another in the memory areas of the data memories belonging to the input line units are synchronously driven in cyclical repetition in a defined sequence for the output of stored data bits. Based on the criterion of an enable information respectively available to the input line units, only one of the synchronously offered data bits corresponding to one another from the individual data memories is supplied to the exchange bus, whereas the others are masked. The output line units are cyclically successively driven in repetition in a defined sequence for the acceptance of the data bits appearing on the exchange bus, said defined sequence corresponding to the sequence defined for the drive of the memory cells of the data memories. In each of the data memories, one is cyclically repeatedly used for the acceptance, whereas another of the memory areas is used chronologically parallel for the output of data bits.

The invention yields the advantage that only few prefunctions need be undertaken in the central equipment due to the decentralized storing of the data streams and the decentralized, output-related time channel allocation connected therewith. It is thus possible to modularly expand the switching network without modification of the central equipment.

A further advantage of the switching network of the invention is that a bit-by-bit jumpering of data streams is possible with it. In this way, this switching network is not bound to time channel structures that are defined in terms of the bit number.

The present invention is explained in greater detail below with reference to an exemplary embodiment and with reference to drawings referring thereto.

DESCRIPTION OF THE PREFERRED EMBODIMENTS

Figure 1:
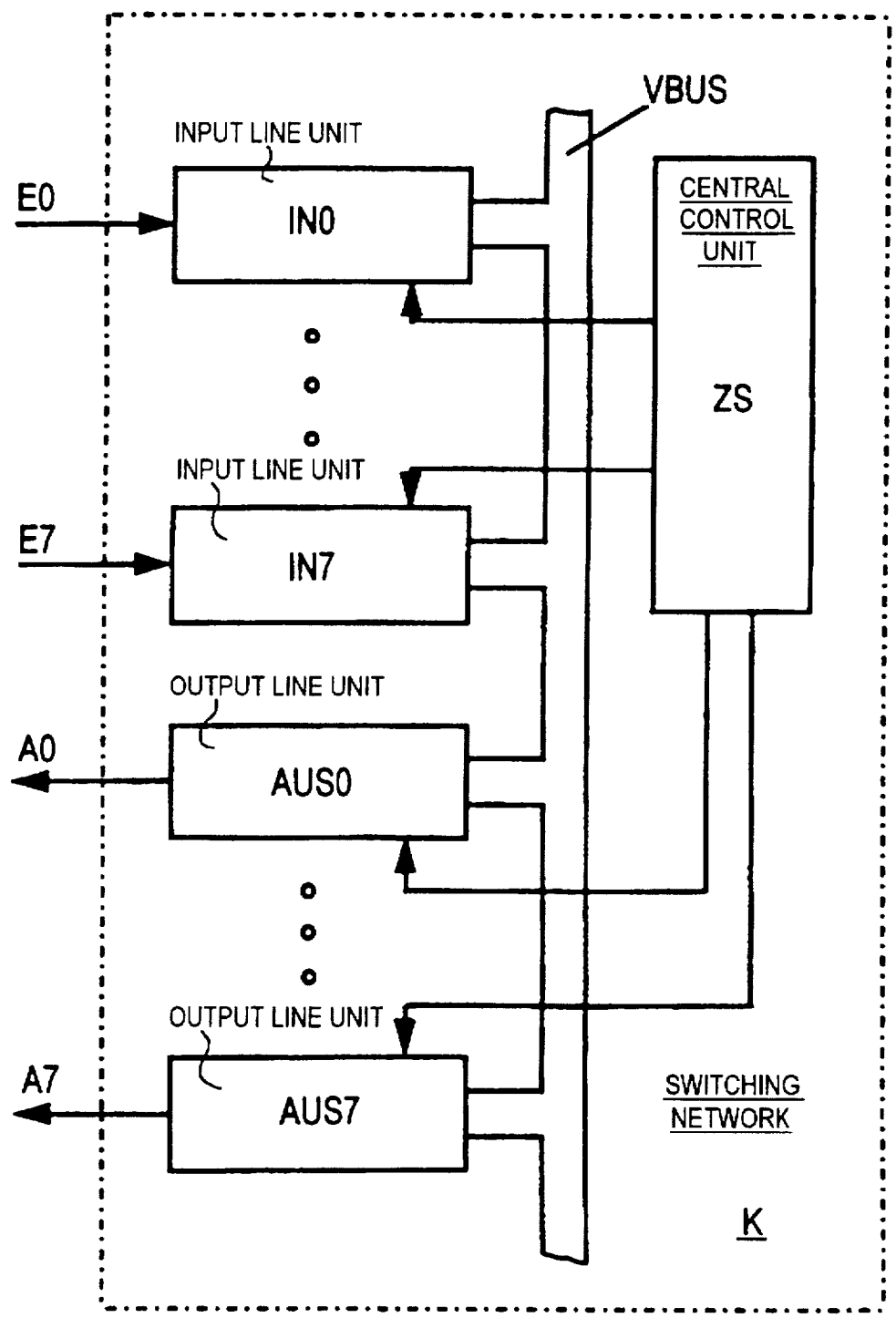
FIG. 1 shows a block circuit diagram of a switching network according to the present invention.

FIG. 1 shows a switching network K to which a plurality of input multiplex lines as well as a plurality of output multiplex lines are connected. In the present exemplary embodiment, eight input and eight output multiplex lines are provided, these being referenced E0, ... .E7 or A0, ... .A7. The transmission of data streams in fixed multiplex frames occurs on these multiplex lines, whereby a defined time channel is allocated to each of the data streams in periodically repeatedly occurring multiplex frames. Such a time channel can comprise $\geq 1$ data bit places within a multiplex frame.

The streams supplied via the individual input multiplex lines E0, ... .E7 are distributed by the switching network K onto the output multiplex lines A0, ... .A7, i.e. the accepted data streams are forwarded in defined time channels of the individual output multiplex lines. The allocation between a time channel defined for a data stream on an input multiplex line and an output multiplex line provided for the forwarding as well as the time channel to be employed thereon is determined given, for example, the presence of dialed connections, during the course of the set up of the respective connection. This allocation is permanently prescribed given the presence of nailed-up connections.

According to FIG. 1, the switching network K comprises a separate input line unit for the connection of the input multiplex lines E0, ... .E7. The input line units are referenced IN0, ... .IN7 according to their allocation to the individual input multiplex lines. In a corresponding way, separate output line units that are referenced AUS0, ... ,AUS7 are provided for the connection of the output multiplex lines A0, ... ,A7. The input line units and output line units are connected in common to an exchange bus VBUS that is controlled by a central control unit ZS.

The data streams supplied to an input line unit IN0, ... ,IN7 in time channels of a multiplex frame are respectively deposited bit-by-bit into a data memory belonging to the respective input line unit. This bit-by-bit storing is implemented in output-related fashion according to the criterion of the afore-mentioned line and time channel allocation. For this purpose, the data memory, as shall be explained in greater detail below, comprises a plurality of memory areas each having a respective plurality of memory cells that are respectively individually allocated to a specific data bit place of a multiplex frame on the respective output multiplex line. The individual, accepted data bits are entered into these memory cells according to their fixed bit position within a multiplex frame on the respective output multiplex line. They are respectively entered during the course of what is an arbitrary write event with respect to the addressing, so that the data bits to be transmitted within a multiplex frame are individually deposited in the memory cells in correct bit position for the individual output multiplex line.

A plurality of memory areas, moreover, are provided for the data memory in order, as shall be explained below, to be able to continuously write data signals into another memory area at a time during which data signals are read from a memory area. For the output of the data bits stored in an area of the data memory of the input line units IN0, ... ,IN7, the memory cells of the memory area of the individual data memories are periodically repeatedly driven in succession in a defined sequence. This occurs under the control of the central control unit ZS, occurring synchronously for the data memories of all input line units. This means that one data bit is first offered from each of the data memories for each bit place of a multiplex frame to be output via an output multiplex line. They are offered by the synchronous drive of the individual memory cells in the data memories. Which of these data bits is then to be actually output to the exchange bus VBUS as a valid data bit is then determined by enable information respectively deposited in the input line units. The enable information is offered by the central control unit ZS. The data bits enabled as valid in this way are ultimately supplied to the exchange bus. For an acceptance of these data bits by the output line units coming into consideration, these are individually controlled in acceptance-edited fashion by the central control unit ZS via separate control lines shown in FIG. 1. This occurs in a sequence that corresponds to the sequence of the drive of the memory cells in the data memories of the input line units. The individual data bits accepted in this way into the individual output line units are then forwarded to the corresponding output multiplex line.

An overview of the functioning of the switching network K shown in FIG. 1 having been presented above, the structure of the identically designed input line units IN0, ... ,IN7 shall be discussed in greater detail with reference to FIGS. 2 and 3 based on the example of the input line unit IN0. Only those circuit elements critical for an understanding of the present invention are shown. It is therefore assumed merely by way of example for the following explanation that respective multiplex frames that have 32 time channels available for respectively eight data bits are defined for the input and output multiplex lines E0, ... ,E7 or A0, ... ,A7. Such a frame structure is used, for example, for the transmission of digital voice information in PCM30,32 systems. Beyond this, it is assumed that the exchange bus VBUS is fashioned as a bit-parallel bus having a width of 8 bits.

Figure 2:
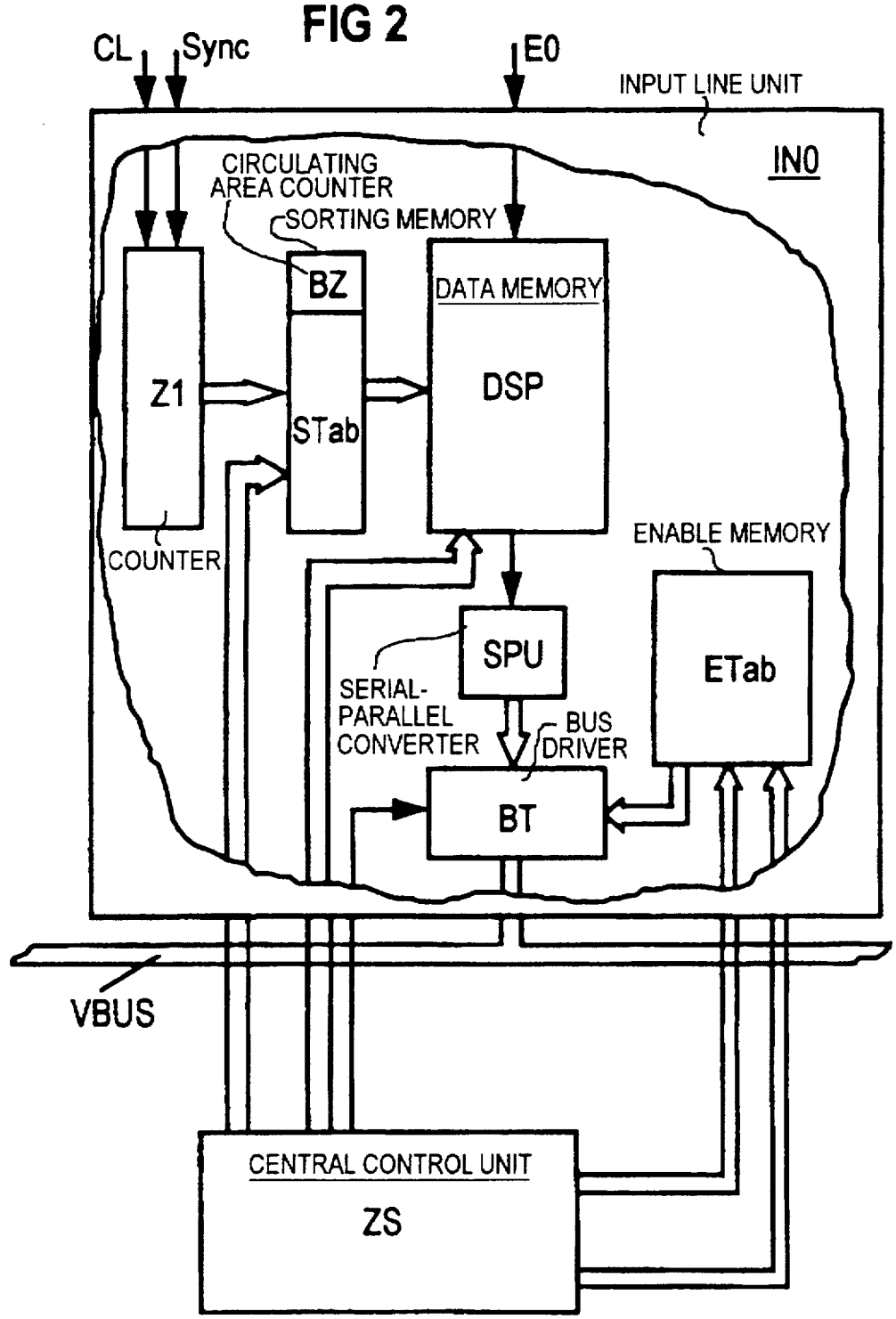
FIG. 2 shows a possible structure of one of the input line units that are only schematically shown in FIG. 1.

According to FIG. 2, the input line unit IN0 comprises an afore-mentioned data memory DSP to which the data bits received from the input multiplex line E1 are supplied. This data memory comprises a plurality of memory areas that, corresponding to the assumed frame structure and the total of eight existing output multiplex lines, respectively have 2048 1-bit memory cells available to them, these being referenced 0 through 2047 in FIG. 3. Of these memory cells, eight successive memory cells are allocated as a cell group to one of the time channels of a multiplex frame for the respective output multiplex line. I.e., a total of 256 cell groups are provided, each of which comprises eight bit places (bit 0 through bit 7) corresponding to the number of eight bit places provided in a time channel of a multiplex frame. Of the first eight cell groups, one is allocated to the output multiplex lines A0, ... ,A7 for the first time channel (channel 0), one of the second eight cell groups is allocated for the second time channel (channel 1) and, finally, one of the last eight cell groups is allocated for the thirty-second time channel (channel 31). For example, an interlacing by time channels occurs for the individual output multiplex lines due to the organization of the data memory.

As already mentioned above, the data memory comprises a plurality of identical organized memory areas. In the present exemplary embodiment, ≧3 memory areas are provided, whereby received data bits are transferred in one of the memory areas while a further memory area is driven parallel thereto for the afore-mentioned output of stored data bits. Under the condition that the multiplex frames occur on the individual input multiplex lines synchronized in phase and frequency with an internal system clock that, among other things, controls the read events in the individual data memories, however, two memory areas in the individual data memories would suffice.

What are referred to as dual-port memory modules wherein a corresponding plurality of memory areas is logically defined can thereby be used for the realization of data memories designed in this way. Alternatively thereto, the individual memory areas of the data memories can also be constructed with separate memory modules.

For the acceptance of the data bits appearing on the input multiplex line E1 into the memory DSP of the input line unit IN0, the bit position of the individual data bits within a multiplex frame is determined with the assistance of a cyclically circulating counter Z1. This counter is set by a synchronization signal Sync indicating the start of a multiplex frame to a defined initial counter reading from which the counter reading is continuously modified with the assistance of a data bit clock CL supplied to the counter. Upon reception of a data bit, the current counter reading —which corresponds to the bit position of this data bit within a multiplex frame —is supplied to a sorting memory STab as address information. An address information under which the respective, received data bit is to be stored in the data memory DSP is thus stored in this sorting memory Stab under each of the supplied addresses, and thus for each of the bit positions within a multiplex frame. Such an address information is supplied to the data memory in order to store a data bit that has just been received. In addition to the sorting memory STab, a cyclically circulating area counter BZ is also provided whose counter reading is modified after every counting cycle of the counter Z1 and indicates the current counter reading of that memory area of the data memory DSP in which data bits just being received are to be stored. This current counter reading is additionally supplied to the data memory DSP as address information. The individual memory areas of the data memory DSP are successively used for the acceptance of data bits under the control of the area counter BZ.

For the read out of data bits stored in one of the memory areas of the data memory DSP, the memory cells thereof are continuously selected in succession for read operation, beginning with the memory cell 0 and ending with the memory cell 2047. For this purpose, the central control unit ZS supplies the data memory with corresponding address information respectively in the form of an address indicating the memory area as well as the respective memory cell. The data bits thus appearing at the output of the data memory are forwarded to a serial-parallel converter SPU which respectively converts eight successive data bits which correspond in number to an afore-mentioned cell group with the data memory DSP, into a parallel bit group. The successive bit groups are then supplied to a bus driver BT. This bus driver is supplied with the afore-mentioned enable information from an enable memory ETab in order to individually enable as valid, or to inhibit the data bits belonging to a bit group that was just accepted, i.e. to mask the respective data bit. In the present exemplary embodiment, the bus driver is designed as what is referred to as a tristate driver whose bit places are separately switched conductive or as a high-impedance.

Figure 3:
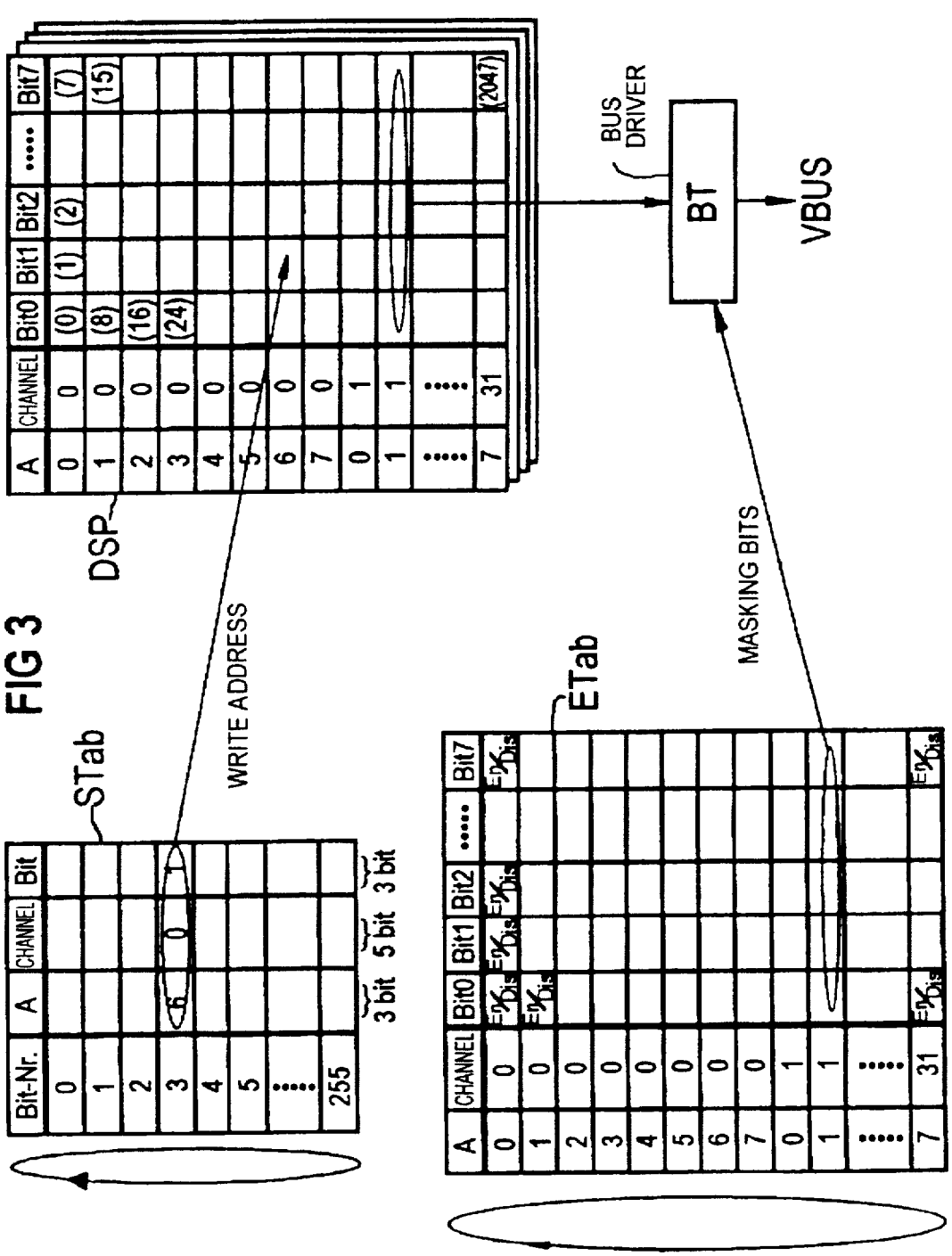
FIG. 3 schematically shows the control principle realized in the input line units shown in FIG. 1.

The enable memory ETab is designed for the above-explained control of the bus driver BT according to FIG. 3 such that a cell group in which an enable or masking information is separately stored for each bit place is allocated therein to each of the cell groups defined in the data memory and as shown in FIG. 3. This enable memory is driven parallel to the respective memory area of the data memory DSP with the address information offered from the central control unit ZS in order to output the enable information stored under the respective address to the bus driver BT.

The control events for the read out and offering of data bits stored in the currently selected memory area of the data memory DSP that have been explained sequence until all data bits stored in this memory area have been read out and have been offered by the bus driver BT after a conversion into bit groups. Following thereupon, a different memory area of the data memory DSP is selected for the output of stored data bits, this memory area being then involved in a corresponding way in the afore-mentioned control events. This means that the individual memory areas of the data memory DSP are cyclically repeatedly driven in succession for the output of stored data bits.

The explained read out of data bits from the data memory DSP and the offering of bit groups by the bus driver BT occur parallel in all input line units IN0, . . . .IN7. As a result of the designational masking of the invalid data bits by the individual bus drivers, bit groups that respectively have only valid data bits successively appear at last on the exchange bus VBUS. These bit groups are then supplied to the output line units AUS01, . . . .AUS7 coming into consideration in that these are cyclically repeatedly driven in succession in a sequence that corresponds to the sequence of the drive of the individual cell groups of a memory area of the data memory DSP in the input line units IN0, . . . .IN7. The bit groups accepted in this way by the individual output line units are then forwarded to the respectively corresponding output multiplex line A0, . . . .A7 after a parallel-to-serial conversion.

The bus drivers BT of the individual input line units IN0, . . . .IN7, moreover, can be inhibited by the central control unit ZS via separate control lines shown in FIG. 2, so that the individual input line units can be designationally connected to the exchange bus, or can be disconnected therefrom. The cyclical drive of the input line units IN0, . . . .IN7 and of the output line units AUS0, . . . .AUS7 thereby occurs regardless of whether these are connected to the exchange bus VBUS or not or, respectively, whether the plurality of data bits in the multiplex frame defined for the individual multiplex lines E0, . . . .E7; A0, . . . .A7 is fully exploited or not.

Over and above this, let it also be pointed out that the memory contents of the sorting memory STab and of the enable memory ETab are edited by the central control unit ZS and are updated with every required change. Such a change is required, for example, with every setup or clear-down of a connection. As indicated in FIG. 2, the central control means ZS has access to said memories for the implementation of such modifications. Cyclically repeated access times are provided therefor in the present exemplary embodiment. Over and above this, the enable memories of the individual input line units are regularly read by the central control unit ZS in order to be able to recognize memory errors therein that lead to faulty enables of individual data bits and, thus, to bit collisions on the exchange bus VBUS.

In conclusion, let it also be pointed out that the designing of the input line units IN0, . . . .IN7 and of the exchange bus VBUS explained with reference to FIGS. 2 and 3 represents only one possible embodiment. In particular, the organization of the data memories in the individual input line units can be modified when a structure deviating from the example that has been set forth is selected for the exchange bus in view of the transmission width of data bits.

Beyond this, the present invention can also be employed when a defined number of successive multiplex frames are combined in a superframe on the individual multiplex lines. The individual data bits of such a superframe are thereby handled in the above-explained way. Compared to a handling of individual multiplex frames, such a procedure yields a finer granularity.

Although various minor changes and modifications might be proposed by those skilled in the art, it will be understood that my wish is to include within the claims of the patent warranted hereon all such changes and modifications as reasonably come within my contribution to the art.

I claim as my invention:

1. A switching network, comprising:

a plurality of input units for acceptance of data streams transmitted in time channels of input multiplex frames appearing in periodic repetition;

a plurality of output line units for forwarding the data streams in time channels of output multiplex frames in periodic repetition;

the input line units and the output line units being connected in common to an exchange bus;

a data memory for each of the input line units, but no data memory being provided in the output line units;

each of the data memories having a plurality of memory areas each having a respective plurality of memory cells available, the memory cells being individually allocated to data bit places of an output multiplex frame for the individual output line units;

for the acceptance of data bits supplied to the respective input line units in an input multiplex frame, the memory cells of the individual memory areas of the corresponding data memories are driven randomly and individually bit-by-bit according to a criterion of allocation information available to the respective input line units;

a central control unit controlling the data memories such that the memory cells allocated to one another in the memory areas of the data memories associated with the corresponding input line units are synchronously driven in cyclical repetition in a defined sequence for the output of stored data bits;

based on a criterion of enable information respectively available to the input line units, only one of synchronously offered data bits corresponding to one another from the individual data memories is supplied to the exchange bus, whereas the others are masked;

said central control unit being connected to said output line units for cyclically successively driving them in repetition in a defined sequence for acceptance of the data bits appearing on the exchange bus, said sequence corresponding to said defined sequence for the drive of the memory cells of the data memories; and in each of the data memories one of the memory areas is cyclically repeatedly used for said acceptance, whereas another is used chronologically parallel for the output of data bits.

2. A switching network according to claim 1 further including an allocation memory in each of the respective input line units for storing said allocation information for the respective input line units, said allocation memory being driven with an address for each of the data bits to be accepted into the data memory, said address corresponding to a data bit place for the respective data bit within an input multiplex frame, and said allocation memory offering an address for drive of the corresponding data memory stored under the respective address.

3. A switching network according to claim 2 wherein said allocation information is in the form of an allocation table, and wherein said allocation table is updated preceding from the central control unit with every setup or cleardown of a connection.

4. A switching network according to claim 1 wherein each of the input line units has a corresponding enable memory for storing said enable information; and said enable memory storing control information allocated to the memory cells of the corresponding data memory and according to whose criterion supply data bits are output to the exchange bus or the supply data bits are masked.

5. A switching network according to claim 4 wherein said enable information is in the form of an enable table which is updated preceded from the central control unit with every setup or cleardown of the connection.

6. The switching network according to claim 1 wherein a defined plurality of successive memory cell is allocated to one of the output line units as a memory cell group in the data memory of the respective input line unit, data bits respectively stored in the memory cell groups are supplied as a bit group to the exchange bus, and the output line units, when respectively driven, except the bit group currently offered on the exchange bus.

\* \* \* \* \*